(12) United States Patent
Hoffner et al.

(10) Patent No.: US 6,523,886 B2
(45) Date of Patent: Feb. 25, 2003

(54) FRONT UNIT ASSEMBLY OF AN AUTOMOTIVE VEHICLE, COMPRISING AN IMPROVED COMPONENTS-FASTENING DEVICE, AND VEHICLE EQUIPPED WITH SUCH AN ASSEMBLY

(75) Inventors: Jacques Hoffner, Ingolstadt (DE); Jean-Philippe Blondeau, Pontarlier (FR)

(73) Assignee: Faurecia Industries, Boulogne Billancourt (FR)

( * ) Notice: Subject to any disclaimer, the term of this patent is extended or adjusted under 35 U.S.C. 154(b) by 0 days.

(21) Appl. No.: 10/073,998

(22) Filed: Feb. 14, 2002

(65) Prior Publication Data

US 2002/0117875 A1 Aug. 29, 2002

(30) Foreign Application Priority Data

Feb. 15, 2001 (FR) .............................. 01 02095

(51) Int. Cl.$^7$ .................................................. B60J 7/00
(52) U.S. Cl. .................................. 296/194; 396/203.02
(58) Field of Search ........................... 296/194, 203.02, 296/155, 197; 293/117; 116/28 R, 35 R; 362/549, 505, 507; 180/684

(56) References Cited

U.S. PATENT DOCUMENTS

| | | | | |
|---|---|---|---|---|
| 4,807,094 A | * | 2/1989 | Mateos et al. | 296/194 |
| 5,106,148 A | * | 4/1992 | Ikeda et al. | 296/194 |
| 5,123,695 A | * | 6/1992 | Kanemitsu et al. | 296/194 |
| 5,271,473 A | * | 12/1993 | Ikeda et al. | 296/194 |
| 5,573,299 A | * | 11/1996 | Masuda | 296/194 |
| 5,580,122 A | * | 12/1996 | Muehlhausen | 296/194 |
| 5,658,041 A | * | 8/1997 | Girardot et al. | 296/194 |
| 5,865,500 A | * | 2/1999 | Sanada et al. | 296/194 |
| 6,189,958 B1 | * | 2/2001 | Guyomard et al. | 296/194 |
| 6,196,624 B1 | * | 3/2001 | Bierjon et al. | 296/194 |
| 6,216,810 B1 | * | 4/2001 | Nakai et al. | 296/194 |
| 6,273,496 B1 | * | 8/2001 | Guyomard et al. | 296/194 |
| 6,290,287 B1 | * | 9/2001 | Guyomard | 296/194 |
| 6,357,821 B1 | * | 3/2002 | Maj et al. | 296/194 |
| 6,364,403 B1 | * | 4/2002 | Ozawa et al. | 296/194 |
| 6,386,624 B1 | * | 5/2002 | Schultz et al. | 296/194 |
| 6,412,855 B1 | * | 7/2002 | Cantineau et al. | 296/194 |
| 6,450,279 B1 | * | 9/2002 | Latcau | 296/194 |
| 2001/0010275 A1 | * | 8/2001 | Sasano et al. | 296/203.02 |
| 2001/0026081 A1 | * | 10/2001 | Ozawa et al. | 296/194 |

FOREIGN PATENT DOCUMENTS

| | | | |
|---|---|---|---|
| DE | 199 46 995 A 1 | | 4/2000 |
| FR | 2625164 | * | 12/1988 |
| JP | 3-213472 | * | 9/1991 |
| JP | 3-284481 | * | 12/1991 |
| JP | 4-63774 | * | 2/1992 |
| JP | 4-197880 | * | 7/1992 |
| JP | 5-105115 | * | 4/1993 |

* cited by examiner

Primary Examiner—Kiran Patel
(74) Attorney, Agent, or Firm—Young & Thompson

(57) ABSTRACT

Front unit assembly of an automotive vehicle, includes a front face (7) having a central section (9) and two lateral sections (11), a bumper (17), a bumper skin (19), two laterally extending brackets (43) and two optical units (21). Each optical unit (21) and the respective front wing section (5) are fixed rigidly to the corresponding bracket (43) at a same reference point of attachment (60), the bracket (43) being endowed with an elasticity substantially greater than that of the front face (7), so that it is prone to elastic deformation as a function of relative adjustment movements of the bumper skin (19), the wing (5) and/or the optical unit (21).

17 Claims, 3 Drawing Sheets

FRONT UNIT ASSEMBLY OF AN AUTOMOTIVE VEHICLE, COMPRISING AN IMPROVED COMPONENTS-FASTENING DEVICE, AND VEHICLE EQUIPPED WITH SUCH AN ASSEMBLY

FIELD OF THE INVENTION

The present invention relates to a front unit assembly of an automotive vehicle, comprising a front face having a central section and two lateral sections, a bumper, a bumper skin forming the fillet of the said bumper, two brackets, each extending from the central section to which it is fixed towards a respective lateral section and forming support members for the said bumper skin, and two optical units, each being supported by a respective lateral section and having a lateral peripheral section suitable for cooperating with a complementary recess in a respective front wing section.

BACKGROUND OF THE INVENTION

A major difficulty encountered by motor vehicle and/or front unit manufacturers consists in positioning the optical units in a precise manner relative to the other styling elements constituted by the wings and the bumper skin. This fit is important, since a lack of surface continuity of the visible section of the optical unit, that is to say of the glass, the corresponding wing and the bumper skin, substantially impairs the aesthetic quality of the vehicle. Moreover, a precise adjustment of the optical unit position relative to the wing and to the bumper skin is difficult to maintain between the operation to mount the optical units on the front face and the operation to fit the furnished front unit on the vehicle box.

These difficulties have been aggravated by the widespread use of single-unit optics integrating the blinker function, whereas previously the blinker section was adjustable relative to the main section of the headlamp housing, so that it was relatively easy to balance the relative-positioning tolerances of the various components of the front unit.

At present, in the case of single-unit optics integrating the blinker function, the optical unit is generally fixed at four points on the front face, which constitutes a rigid part. Following assembly of the optical unit, this is mounted on the vehicle box and the front ends of the body wings are fixed thereto. In a following operation, the motor vehicle manufacturer adjusts the position of the optical unit relative to the wing, by acting upon two points of attachment of the optical unit to the front face.

The major drawback of this modus operandi, which is dictated by the constitution of the front unit assembly, lies in this repeat operation at the end of the assembly, which consists in adjusting the position of the optical unit.

Moreover, this delicate adjustment must be carried out for all vehicles, taking into account the production and assembly tolerances of the various elements involved. Since these elements are also prone to greater or lesser deformation, the surface alignments obtained by these adjustments are not stable over time and may require supplementary adjustments.

SUMMARY OF THE INVENTION

A main object of the invention is to remedy these drawbacks and to propose a front unit assembly of an automotive vehicle, the components layout of which allows automatic and permanent positioning of the visible contours of the optical units relative to the corresponding wing end as well as to the bumper skin, combined with a relatively precise positioning of the wing ends and bumper skin under the same conditions.

To this end, according to the invention, each optical unit and the respective front wing section are fixed rigidly to the corresponding bracket at a same reference point of attachment, the said bracket being endowed with an elasticity substantially greater than that of the front face, so that it is prone to elastic deformation as a function of relative adjustment movements of the bumper skin, the wing and/or the optical unit.

According to other characteristics of the invention:

the bumper skin is fixed rigidly to each bracket at at least one point constituted by the said reference point of attachment;

each bracket comprises a transverse channel receiving a complementary lateral edge of the bumper skin, so that the said edge can slide in the channel as a function of relative adjustment movements of the bumper skin, the wing and/or the optical unit;

each bracket has one end fixed rigidly to the central front face section, the other end being free, such that the bracket is prone to spring movement relative to the rigid fastening end;

each optical unit is fixed rigidly to the rigid fastening end of the bracket at one point of attachment, defining a single point of attachment;

each optical unit comprises a mutually integral housing and glass and the single point of attachment is obtained by a fastening member integral with the housing and a complementary fastening member integral with the rigid fastening end of the bracket;

the bracket comprises an elastic hook-fastening member, complementary to a hook-fastening member integral with the respective front wing section such as to apply a prestressing force to the wing, at a point situated at a distance from the reference point of attachment, the said force being directed substantially from front to rear in the general direction of the wing;

each optical unit and the respective front wing section are fixed rigidly to the front face at a same point of attachment, defining a double point of attachment;

the said double point of attachment is obtained by a fastening member integral with the housing and complementary fastening members of the respective front wing section and of the front face;

each optical unit comprises at least one indexing member suitable for cooperating with a complementary indexing member integral with the corresponding front wing section;

the said at least one indexing member is a slug, whereas the complementary indexing member is a groove formed in the corresponding front wing section;

each optical unit comprises two such indexing members;

a first indexing member and the complementary member are of a form suitable for allowing relative play between the optical unit and the wing along a substantially vertical axis;

a second indexing member and the complementary member are of a form suitable for allowing relative play between the optical unit and the corresponding wing along an axis directed substantially in the general direction of the wing;

at least one indexing member is integral with the glass; and the reference point of attachment is obtained by a fastening member integral with the glass and complementary fastening members provided on the respective front wing section and the respective bracket.

A further object of the invention is an automotive vehicle equipped with a front unit assembly such as previously defined.

BRIEF DESCRIPTION OF THE DRAWINGS

A better understanding of the invention will be gained from the following description provided purely by way of example and given with reference to the appended drawings, in which.

DETAILED DESCRIPTION OF THE INVENTION

Figure 1:
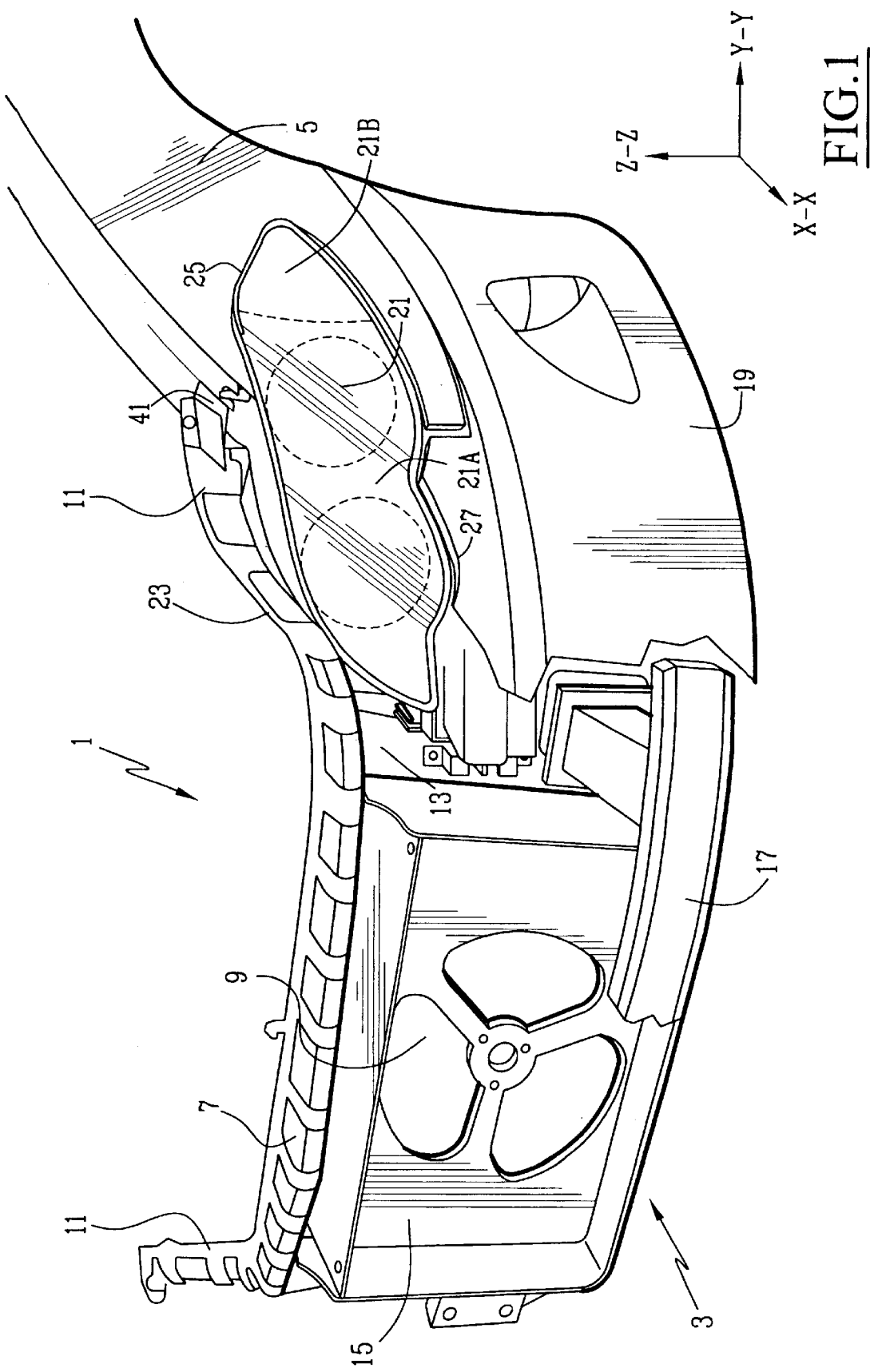
FIG. 1 is a diagrammatic perspective view of a front unit assembly according to the invention, to which is fixed a front end section of a body wing.

FIG. 1 shows a front section 1 of an automotive vehicle, constituted by a front unit assembly 3 and a front end 5 of a body wing.

In this figure, as in the course of the description which will be given with reference to the other figures, an orientation along three axes X-X, Y-Y and Z-Z is defined, which axes correspond to the usual orientation of the vehicle, viz. respectively to the longitudinal axis orientated in the forward travel direction X-X, to the transverse axis Y-Y and to the vertical axis Z-Z orientated from bottom to top. All of the terms used in the course of the description and able to indicate a direction or positioning must be understood with reference to this system of coordinates.

The front unit assembly 3, or more simply the front unit, comprises an essentially rigid structure constituted by a front face 7 having a central section 9 and two lateral sections 11, the central section 9 being laterally delimited by two vertical stays 13 symmetrical relative to the longitudinal plane of symmetry of the vehicle X-Z. Arranged between these stays 13 is a recess receiving, in particular, a heat exchanger 15. A bumper 17 formed essentially of a transverse bar projecting from the front face 7, in a lower section of the latter, is fixed to each of the vertical stays 13. A bumper skin 19, made in one piece from plastics material or sheet metal, is disposed over the full width of the front face 7, such as to constitute a fillet of the bumper 17, extending laterally beyond lateral front face sections 11 and taking up position beneath an edge of the front end of the wing 5, congruent therewith. An optical unit 21 is mounted in each lateral front face section 11 such as to be integrated in complementary mouldings belonging to the upper edge 23 of the front face, to an indentation or recess 25 in the front end of the wing 5 and to an upper edge 27 of the bumper skin 19.

It is clear that the components which have just been described generally have a symmetry relative to the longitudinal plane of symmetry of the vehicle X-Z, so that a description will be given of only one section of the front unit of interest to the invention, situated at the front left of the vehicle, given that identical arrangements are provided on the front right side.

Figure 2:
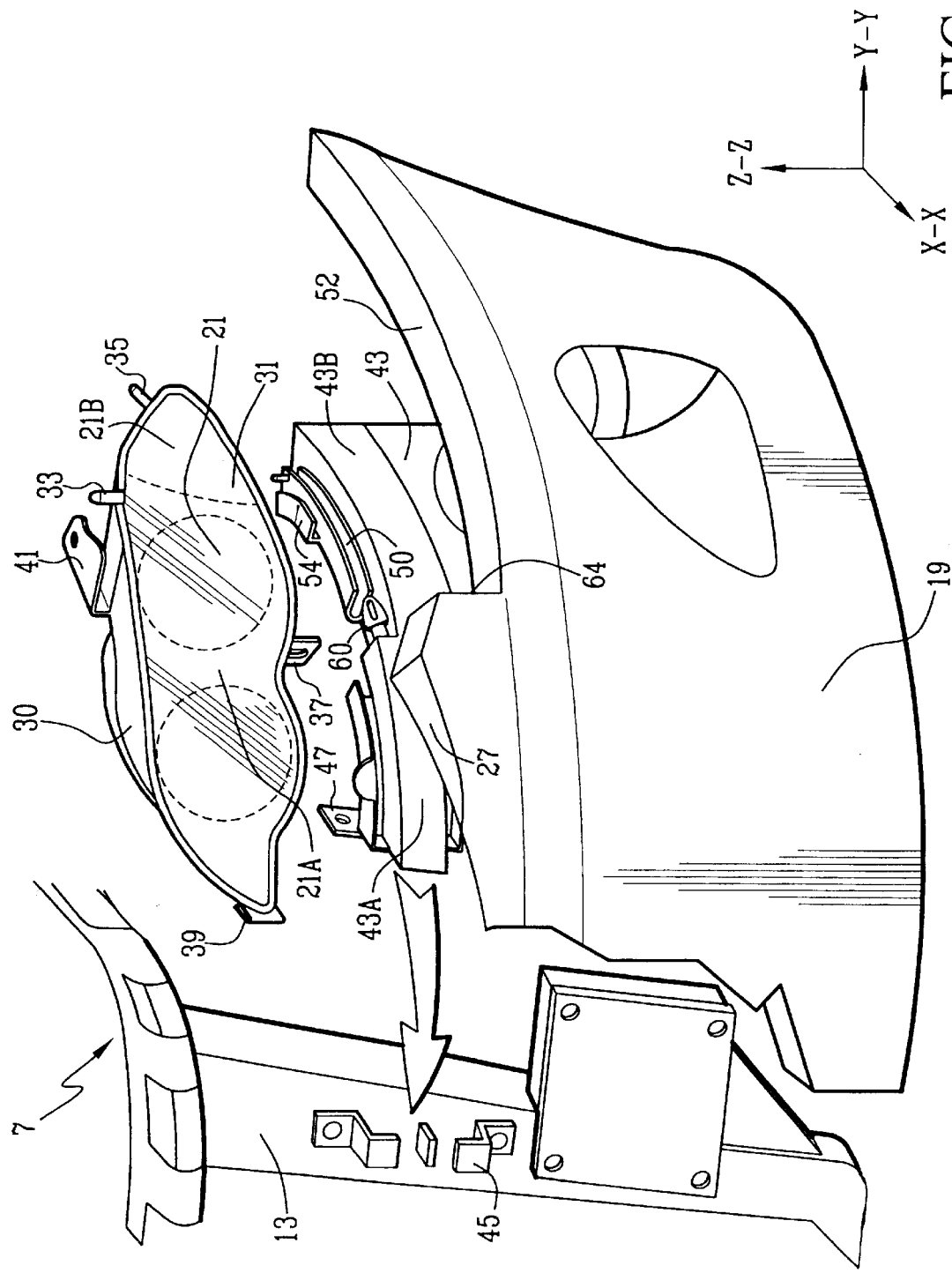
FIG. 2 is a diagrammatic perspective view, on larger scale, of a lateral section of the front unit assembly represented in FIG. 1, the components being separated.

With reference to FIG. 2, a more detailed description shall now be given of the way in which the optical unit 21 and the bumper skin 19 are fixed to the front face 7.

The optical unit 21 is a single unit comprising a headlamp section 21A and a blinker section 21B, joined together without relative play. It essentially comprises a housing 30, inside which are mounted some bulbs, and which is intended to fit into the corresponding lateral front face section 11, and a glass 31 intended to ensure a continuity of styling between the upper edge 27 of the bumper skin 19, the indentation 25 and the upper edge 23 of the front face. Two centring slugs 33, 35 project from the peripheral edge of the glass 31 and are designed to cooperate with corresponding grooves in the front end 5 of the wing, grooves which will be described with reference to FIG. 3. A first fastening lug 37 projects from the lower peripheral edge of the glass 31. A second fastening lug 39 and a third fastening lug 41, made from the same material as the housing 30, are respectively formed onto a lateral face of the housing, on the side of the central front face section 9, and onto an upper face of the housing 30.

The front unit 3 additionally comprises a curved bracket 43 extending substantially in the direction of the bumper skin 19, from the stay 13 up to a lateral end of the corresponding lateral front face section 11. This curved bracket 43 is fixed rigidly by one of its ends 43A to the vertical stay 13 of the front face 7, in a complementary guide 45 on the stay 13, by traditional fastening means (not represented), for example rivets or screws. Next to the fastening region 43A, projecting from this end of the bracket 43, is formed a fastening lug 47, made from the same material as the bracket 43. The other end of the curved bracket 43 is a free end 43B, the curved bracket 43 being endowed with a certain elasticity such as to be able to change shape relative to the fastening end 43A. The elasticity of the curved bracket 43 is far greater than the elasticity of the stay 13 and, more generally, of the front face 7 and enables the relative adjustment plays of the bumper skin 19, the optical unit 21 and/or the wing 5 to be balanced.

The curved bracket 43, on an upper face situated substantially to the right of the lateral section 11 of the front face 7 and beneath the optical unit 21, has a channel 50 orientated in the general direction of the bracket 43. This channel 50 receives an upper edge 52 of the bumper skin 19, such that the latter can slide gently in the general direction of the bracket 43 as a function of relative adjustment movements of the bumper skin 19, the wing 5 and/or the optical unit 21. The channel 50 is topped by an elastic hook-fastening member 54, constituted by a channel of smaller dimension than the channel 50 and having an upper edge in the shape of an upward-sweeping tongue. The elastic hook-fastening member 54 receives a complementary tongue, which will be seen in FIG. 3, forming a complementary hook-fastening member integral with the front section 5 of the wing.

Analogously shaped brackets fixed rigidly onto a vertical stay of the front face and supporting the bumper skin are already known in the prior art. On the other hand, brackets of the prior art are designed to be rigid so as to reduce the plays of the bumper skin relative to the front face. Such brackets of the prior art, moreover, are devoid of points of attachment with the headlamp.

In accordance with the invention, the first fastening lug 37 is used to create a rigid point of attachment between the bracket 43 and the optical unit 21, more precisely the glass 31. In the represented example, this point of attachment is obtained by a known fastening of the "quarter-turn" screw type 60, which will not therefore be described here.

The second fastening lug 39 is designed to coincide with the lug 47 projecting from the bracket 43 and to be fitted to the latter in a rigid manner, for example by screwing or riveting.

The third fastening lug 41 is connected in the same way to an upper edge section 23 of the lateral front face section 11 as has been represented diagrammatically in FIG. 1.

Figure 3:
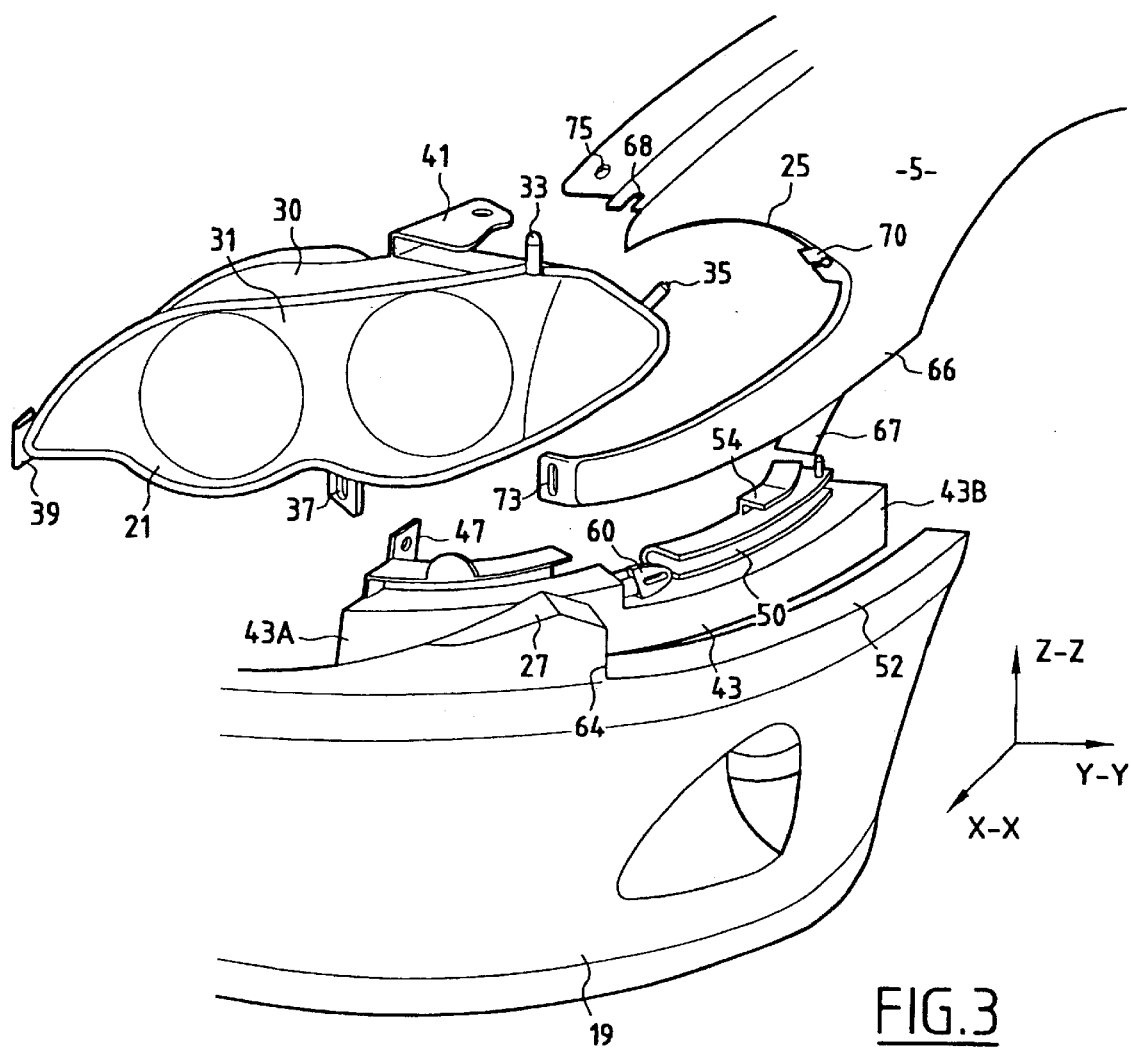
FIG. 3 is an analogous view in which the front end of a body wing has been represented, but not the front face.

Reference is now made to FIG. 3, in which the curved bracket 43 is represented fixed on the stay 13.

The bumper skin 19 has an offset 64 forming a vertical connecting wall between the upper edge 27 cooperating with the lower edge of the optical unit 21 and the upper edge 52 fitting into the channel 50. The vertical wall 64 is pierced and configured in such a way as to fit together with the fastening lug 37 of the optical unit 21, on the quarter-turn fastening screw 60 for fixing to the bracket 43.

The front end 5 of the wing has a lower band 66 defined by the indentation 25, this lower band 66 being intended to cooperate by its lower edge with the upper edge 52 of the bumper skin 19 and by its upper edge with the optical unit 21.

Projecting from a lower edge of the band 66, a tongue 67 is formed, constituting the complementary Oelastic hook-fastening member, and bearing on the raised flange of the latter such as to create a prestressing force on the wing 5 at a point situated at a distance from the reference point of attachment 60. The prestressing force is substantially directed from front to rear in the general direction of the wing 5.

At the end of a quasi-horizontal face of the front end 5, a first groove 68 is formed, intended to receive the first slug 33 of the optical unit 21. In the bottom of the indentation 25, a second groove 70 is formed in a manner complementary to the second slug 35 of the optical unit 21.

Two pairs 33, 68, 35, 70 of indexing members for the optical unit 21 are thus obtained on the wing 5.

The first pair of indexing members 33, 68 permits a relative adjustment displacement between the optical unit 21 and the wing 5 along a substantially vertical axis, whereas the second pair of indexing members 35, 70 permits a relative displacement substantially in the direction of the wing 5.

At the front end of the lower band 66 of the front end of the wing 5, a slot 73 is formed on a flat section, which slot is intended to ensure a fixed punctual connection with the bracket 43 by means of the quarter-turn screw 60.

As can be seen, at an intermediate point of the bracket 43, a reference point of attachment is realized, which simultaneously connects punctually and rigidly, by means of the quarter-turn screw 60, the optical unit 21 by its first fastening lug 37, the bumper skin 19 by its offset 64 and the front end of the wing 5 by the front end of the lower band 66 bearing the slot 73.

Close to the first groove 68 in the front end of the wing 5, a hole 75 is formed, congruent with the point of attachment of the third fastening lug 41 of the optical unit 21 on the lateral front face section 11.

On the lateral front face section 11, a double point of attachment is thus simultaneously obtained, by traditional riveting or screwing means, for example, of the optical unit 21 by its third fastening lug 41 and of the front end of the wing 5 by the hole 75.

The rigid connection of the optical unit 21 on the vertical stay 13 by means of the second fastening lug 39 defines, per se, a single point of attachment.

Figure 4:
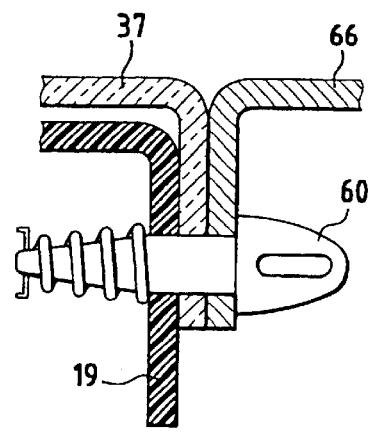
FIG. 4 is a diagrammatic detailed sectional view of the reference point of attachment connecting the optical unit, the front end of the wing, the bumper skin and the bracket.

FIG. 4 shows a diagrammatic representation of the reference point of attachment realized by screwing, by means of the quarter-turn screw 60, of a section 64 of bumper skin 19, a section 37 of optical unit 21 and a section 66 of wing, these sections being superposed and gripped by means of the screw 60.

The process for mounting the various components of the front unit assembly 3 and for fitting the front unit 3 and wing sections 5 is realized according to a sequence of operations comprising the following steps:

the bracket 43 is fixed onto the stay 13, the position of the bracket in its associated guide 45 being adjusted, for example, by means of assembly jigs, which will not be described here;

the bumper skin 19 is fixed onto the front face 7 and the upper edge 52 is inserted in the channel 50, the offset 64 being connected to the bracket 43 by means of the quarter-turn screw 60 and the tongue 67 being introduced into the elastic hook-fastening member 54;

the optical unit 21 is fixed onto the bracket 43, firstly at the level of the reference point produced by the quarter-turn screw 60 and the first lug 37, then at the level of the single point of attachment produced by the fastening lug 39 and the corresponding lug 47;

the front unit 3 thus obtained is next fitted onto the vehicle box;

finally, the wing 5 is brought near to the front unit 3 to be joined together with the latter, firstly at the level of the reference point of attachment, that is to say by linking the slot 73 to the quarter-turn screw 60, then by fixing the wing 5 to the optical unit 21, by linking the third lug 41 of the optical unit 21 to the hole 75 and by successively linking the pairs of indexing members 33, 68 and 35, 70.

By virtue of the invention, a statically redundant assembly is realized between three components, viz. the optical unit 21, the bumper skin 19 and the wing 5, prone to relative plays during their assembly, which assembly is fit for balancing the production tolerances of these parts. A precise relative positioning of these parts is thereby obtained, the alignment of the edges and connecting surfaces visible from the vehicle exterior being constantly observed.

As a result of the invention, the front section of the vehicle can acquire an optimal aesthetic quality, which is constant over time, and this without supplementary repeat and adjustment operations subsequent to the vehicle assembly.

Moreover, the elasticity of the lateral sections of the front unit 3, brought about by the elasticity of the bracket 43, allows slight deformation of these lateral sections, through inward contraction, as the front unit is mounted onto the vehicle box. This facilitates the use of assembly jigs, which allow the front unit to be fixed onto the vehicle box in a precise and automated manner.

Another advantage of the invention lies in being able to index not only the position of the optical unit 21 relative to the indentation 25 in the wing 5, but more precisely the glass 31 of the optical unit 21 relative to the indentation 25, the glass itself constituting a styling element directly visible from the vehicle exterior. The same applies to the attachment to the bracket 43, obtained by a member integral with the glass 31.

What is claimed is:
1. Front unit assembly of an automotive vehicle, comprising a front face (7) having a central section (9) and two lateral sections (11), a bumper (17), a bumper skin (19) forming the fillet of said bumper, two brackets (43), each extending from the central section (9) to which it is fixed towards a respective lateral section (11) and forming support members for said bumper skin (19), and two optical units (21), each being supported by a respective lateral section (11) and having a lateral peripheral section suitable for cooperating with a complementary recess (25) in a respective front wing section (5), wherein each optical unit (21) and the respective front wing section (5) are fixed rigidly to the corresponding bracket (43) at a same reference point of attachment (60), said bracket (43) being endowed with an elasticity substantially greater than that of the front face (7), so that it is prone to elastic deformation as a function of relative adjustment movements of the bumper skin (19), the wing (5) and/or the optical unit (21).

2. Front unit assembly according to claim 1, wherein the bumper skin (19) is fixed rigidly to each bracket (43) at at least one point constituted by said reference point of attachment (60).

3. Front unit assembly according to claim 1, wherein each bracket (43) comprises a transverse channel (50) receiving a complementary lateral edge (52) of the bumper skin (19), so that said edge (52) can slide in the channel (50) as a function of relative adjustment movements of the bumper skin (19), the wing (5) and/or the optical unit (21).

4. Front unit assembly according to claim 1, wherein each bracket (43) has one rigid fastening end (43A) fixed rigidly to the central front face section (9), the other end (43B) being free, such that the bracket (43) is prone to spring movement relative to the rigid fastening end (43A).

5. Front unit assembly according to claim 4, wherein each optical unit (21) is fixed rigidly to the rigid fastening end (43A) of the bracket (43) at one point of attachment, defining a single point of attachment (39, 47).

6. Front unit assembly according to claim 5, wherein each optical unit (21) comprises a mutually integral housing (30) and glass (31), and the single point of attachment (39, 47) is obtained by a fastening member (39) integral with the housing (30) and a complementary fastening member (47) integral with the rigid fastening end (43A) of the bracket.

7. Front unit assembly according to claim 1, wherein the bracket (43) comprises an elastic hook-fastening member (54), complementary to a hook-fastening member (67) integral with the respective front wing section (5) such as to apply a prestressing force to the wing (5), at a point situated at a distance from the reference point of attachment (60), said force being directed substantially from front to rear in the general direction of the wing (5).

8. Front unit assembly according to claim 1, wherein each optical unit (21) and the respective front wing section (5) are fixed rigidly to the front face at a same point of attachment, defining a double point of attachment (41, 75).

9. Front unit assembly according to claim 8, wherein each optical unit (21) comprises a mutually integral housing (30) and glass (31), and said double point of attachment (41, 75) is obtained by a fastening member (41) integral with the housing (30) and complementary fastening members (75) of the respective front wing section (5) and of the front face (7).

10. Front unit assembly according to claim 1, wherein each optical unit (21) comprises at least one indexing member (33, 35) suitable for cooperating with a complementary indexing member (68, 70) integral with the corresponding front wing section (5).

11. Front unit assembly according to claim 10, wherein the said at least one indexing member is a slug (33, 35), whereas the complementary indexing member is a groove (68, 70) formed in the corresponding front wing section (5).

12. Front unit assembly according to claim 10, wherein each optical unit (21) comprises two such indexing members (33, 35).

13. Front unit assembly according to claim 10, wherein a first indexing member (33) and the complementary member (68) are of a form suitable for allowing relative play between the optical unit (21) and the wing (5) along a substantially vertical axis.

14. Front unit assembly according to claim 10, wherein a second indexing member (35) and the complementary member (70) are of a form suitable for allowing relative play between the optical unit (21) and the corresponding wing (5) along an axis directed substantially in the general direction of the wing (5).

15. Front unit assembly according to claim 1, wherein each optical unit (21) comprises a mutually integral housing (30) and glass (31), and at least one indexing member (33, 35) is integral with the glass (31).

16. Front unit assembly according to claim 1, wherein each optical unit (21) comprises a mutually integral housing (30) and glass (31), and the reference point of attachment (60) is obtained by a fastening member (37) integral with the glass (31) and complementary fastening members (60, 73) provided on the respective front wing section and the respective bracket (43).

17. Automotive vehicle comprising a front unit assembly according to claim 1.

* * * * *